(12) United States Patent
Zhou et al.

(10) Patent No.: US 10,166,881 B2
(45) Date of Patent: Jan. 1, 2019

(54) CHARGE-DISCHARGE CONTROLLER

(71) Applicant: DENSO CORPORATION, Kariya, Aichi-pref. (JP)

(72) Inventors: Zhuomin Zhou, Kariya (JP); Mitsuhiro Kanayama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 28 days.

(21) Appl. No.: 15/618,514

(22) Filed: Jun. 9, 2017

(65) Prior Publication Data

US 2017/0355277 A1 Dec. 14, 2017

(30) Foreign Application Priority Data

Jun. 13, 2016 (JP) .................................. 2016-117189

(51) Int. Cl.
*B60L 11/18* (2006.01)
*G06Q 40/00* (2012.01)
*H02J 7/00* (2006.01)

(52) U.S. Cl.
CPC ....... *B60L 11/1861* (2013.01); *B60L 11/1879* (2013.01); *G06Q 40/12* (2013.12); *H02J 7/007* (2013.01)

(58) Field of Classification Search
CPC ... B60L 11/1861; B60L 11/1879; H02J 7/007; G06Q 40/12
USPC ......................................................... 320/109
See application file for complete search history.

(56) References Cited

U.S. PATENT DOCUMENTS 7,100,199 B2 * 8/2006 Ginter .................... G06F 21/10
348/E5.006
8,222,862 B2 * 7/2012 Ichikawa ............ B60L 11/1816
320/116

FOREIGN PATENT DOCUMENTS

JP 2013176195 A 9/2013

* cited by examiner

*Primary Examiner* — M'Baye Diao
(74) *Attorney, Agent, or Firm* — Harness, Dickey & Pierce, P.L.C.

(57) ABSTRACT

A charge-discharge controller includes a resetter for executing a SOC reset charging and a timing calculator for executing a timing calculation process that calculates an execution timing of the SOC reset charging by the resetter. The timing calculator calculates a profit reduction amount by an execution of the SOC reset charging for each of a plurality of time ranges, and sets the execution timing of the SOC reset charging in one or more time ranges to minimize the profit reduction amount, in consideration of an economy of charging of battery besides SOC.

14 Claims, 11 Drawing Sheets

SINGLE TIME RANGE

MULTIPLE TIME RANGES

MULTIPLE TIME RANGES

NORMAL TIME

SOC RESET TIME

CHARGE-DISCHARGE CONTROLLER

CROSS REFERENCE TO RELATED APPLICATION

The present application is based on and claims the benefit of priority of Japanese Patent Application No. 2016-117189, filed on Jun. 13, 2016, the disclosure of which is incorporated herein by reference.

TECHNICAL FIELD

The present disclosure generally relates to a charge-discharge controller that controls/manages a state of charge of a chargeable and dischargeable battery.

BACKGROUND INFORMATION

The battery, or more specifically, a secondary/rechargeable battery, which is chargeable and dischargeable, may have its storage capacity quickly deteriorated when overcharged and over-discharged. Therefore, based on grasping/detecting a state of charge (SOC) of the battery, the charging and discharging have to be controlled. Therefore, the SOC of the battery is typically kept around a middle range in between the full charge (100% SOC) and no charge (0% SOC), which is 50 to 60% SOC. That is, in other words, the SOC may have to be more accurately grasped/detected.

The technique disclosed in the following document Japanese Patent Laid-Open No. 2013-176195 (Patent document 1) is about an intentional over-charging of the battery for an improvement of SOC estimation accuracy, which may gradually deteriorate during the use of the battery. That is, the over-charged state of the battery is assumed/considered as 100% SOC according to the technique of the patent document 1, which is thus designated as an SOC reset charging.

The conventional technique described above dissolves the SOC calculation error by the 100% SOC charging of the battery with a night-time grid power, when a dispersion of terminal voltages among many batteries exceeds a threshold value, based on once-a-day terminal voltage checking at a certain timing of the day.

However, the SOC reset charging in such manner is initiated/triggered by a detected state of the battery, which may not necessarily be a best timing as a whole system, in term of charge timing and the like. More specifically, as an example, the charge timing may optimally be adjusted based on the price of the night-time grid power (where the price may be lower than day-time power), which is not the case in the battery-state-triggered charging technique of the patent document 1.

SUMMARY

It is an object of the present disclosure to provide a charge-discharge controller that is configured to be capable of managing a state of charge (SOC) of the chargeable and dischargeable battery based not only on an SOC, but also on an economic situation in an SOC reset charging.

In an aspect of the present disclosure, a charge-discharge controller controlling a state of charge (SOC) of a storage battery that is chargeable and dischargeable includes a resetter executing an SOC reset charging that brings the battery to an over-charged state, and a timing calculator executing a timing calculation process that calculates an execution timing of the SOC reset charging by the resetter.

The timing calculator executes the timing calculation process and calculates a profit reduction amount as a difference between a planned charge-discharge monetary profit and a SOC reset charging monetary profit for each of a plurality of time ranges, among which (i) the planned charge-discharge monetary profit is calculated as a profit from charging and discharging according to a preset charge-discharge plan and (ii) the SOC reset charging monetary profit is calculated as a profit from executing the SOC reset charging, and the timing calculator sets the execution timing of the SOC reset charging only in one or more time ranges to minimize the profit reduction amount.

According to the present disclosure, the SOC reset charging is performed/executed in one or more time ranges to minimize a profit reduction amount, or a loss of profit, thereby the SOC reset charging is enabled to be performed at an execution timing that is set in consideration of the loss of profit, or the like, in addition to SOC.

The numerals in the Summary section are used only for associating the claim elements with the components/configurations in the embodiments, thereby not limiting the scope of the present disclosure in any sense.

Effects of the Present Disclosure

According to the present disclosure, the charge-discharge controller is enabled to perform the SOC reset charging that not only considers the SOC of the battery but also considers the economic situation,

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, an embodiment of the present disclosure is described, with reference to the accompanying drawings. For the ease of explanation and description, in each of the drawings, the same component has the same numeral assigned thereto, and the same description is not repeated.

Figure 1:
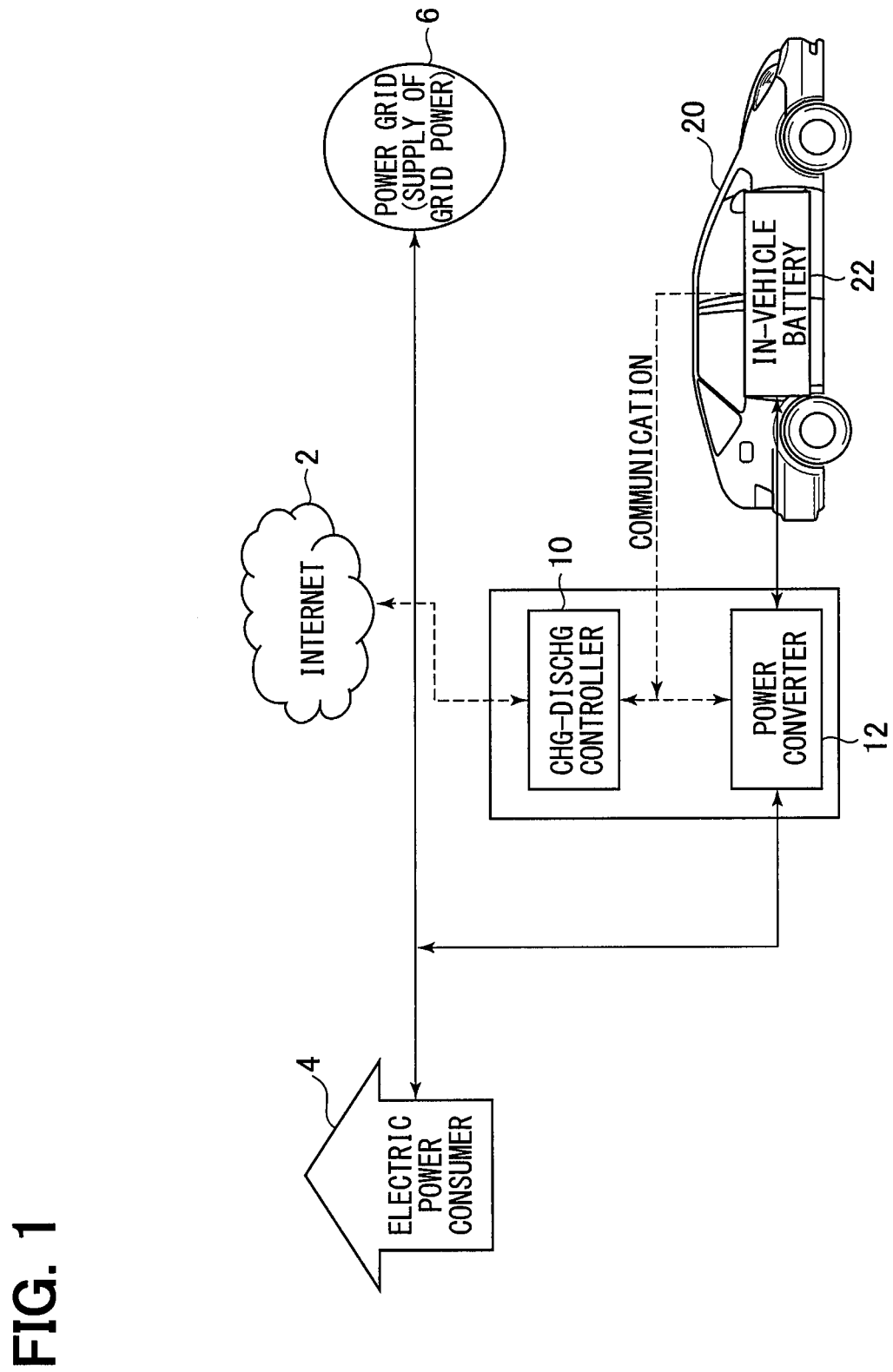
FIG. 1 is a block diagram of a system configuration including a charge-discharge controller concerning an embodiment of the present disclosure.

As shown in FIG. 1, a charge-discharge controller 10 concerning the present embodiment is disposed in a house, or at a site of an electric power consumer 4 which receives an electric power supply from a grid power 6. The charge-discharge controller 10 is capable of receiving power price information via Internet 2. The charge-discharge controller 10 outputs a drive signal which directs/instructs an operation of a power converter 12.

The power converter 12 is a device which performs charge and discharge of an in-vehicle battery 22 that is a storage battery carried in a vehicle 20. The power converter 12 can also perform charge and discharge of not only the in-vehicle battery 22 but also a storage battery of a fixedly-disposed type.

The charge-discharge controller 10 is implemented as a computer, including an arithmetic unit, which may be a Central Processing Unit (CPU), a storage unit, which may be Random Access Memory (RAM), Read-Only Memory (ROM) and the like, an interface unit for receiving and transmitting data, together with other parts.

In the following, functional components of the charge-discharge controller 10 are described.

Figure 2:
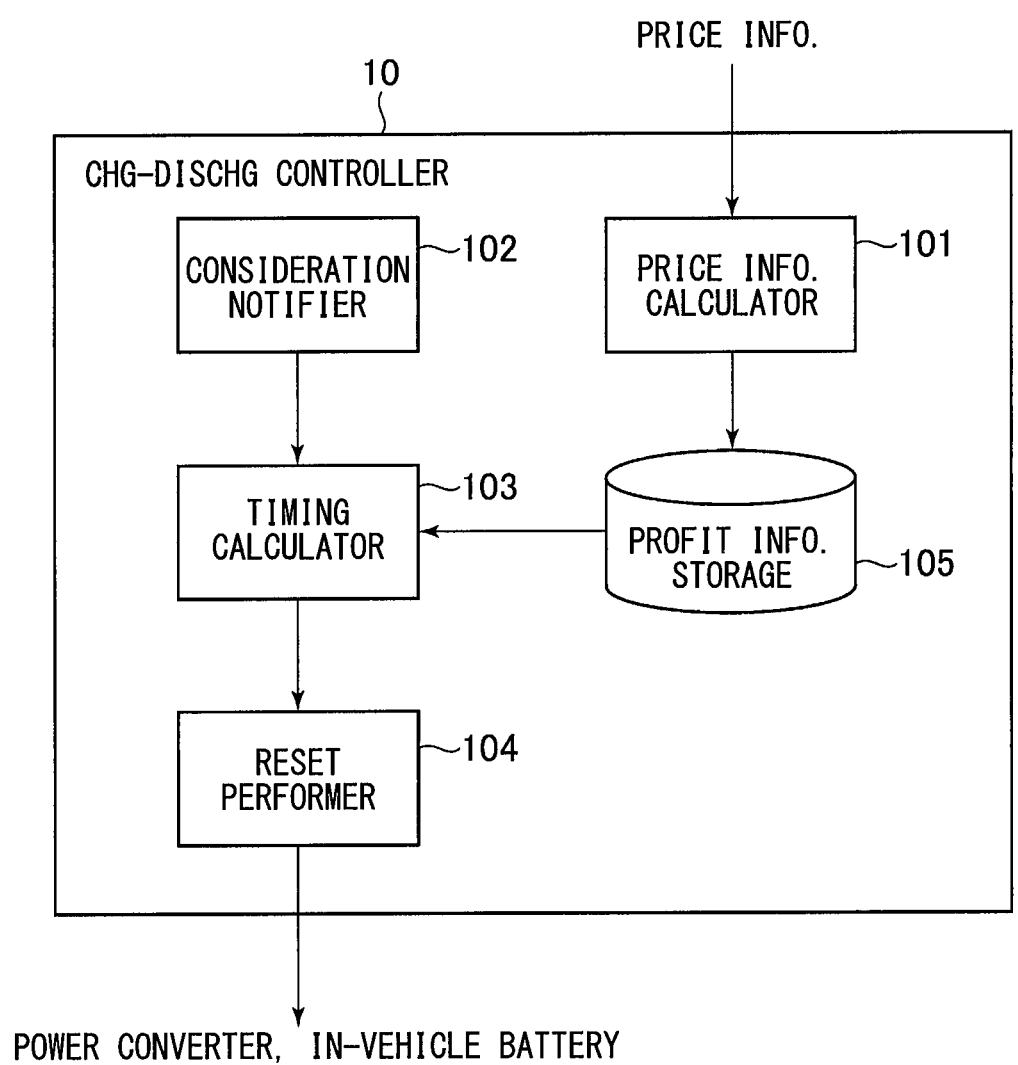
FIG. 2 is a block diagram of a functional configuration of the charge-discharge controller concerning the embodiment of the present disclosure.

As shown in FIG. 2, the charge-discharge controller 10 is provided with a price information calculator 101, a consideration notifier 102, a timing calculator 103, a reset performer 104, and a profit information storage 105.

The price information calculator 101 is a section that receives the information about an electric power price, e.g., a price of the electric power per unit amount.

The price information calculator 101 calculates the electric power price information for each time range, a monetary profit at the time of performing a preset/planned charging for each time range, and a monetary profit at the time of performing an SOC reset charging for each time range, and stores calculation results in the profit information storage 105.

The SOC reset charging brings a storage battery to an over-charged state.

The consideration notifier 102 is a section that outputs a trigger of calculation execution timing to the timing calculator 103 at a predetermined interval at which the timing calculator 103 determines whether to perform the SOC reset charging.

The predetermined interval of such determination may be, for example, an interval of one week, ten days, or the like, which may be arbitrarily determinable. That is, the predetermined interval may be a period of time which necessitates an error correction for accurately estimating the SOC of the storage battery.

The timing calculator 103 is a section that performs a timing calculation processing according to the trigger outputted from the consideration notifier 102, i.e., performs a calculation of an execution timing of the SOC reset charging by the reset performer 104.

The timing calculator 103 calculates, in the timing calculation processing, a difference between (i) the monetary profit at the time of performing the SOC reset charging, and (ii) the monetary profit at the time of performing charge and discharge, according to a charge-discharge plan, and such calculation is performed for each of a plurality of time ranges for the calculation of the above-described difference as a profit reduction amount by the SOC reset charging, and sets the execution timing for performing the SOC reset charging in one or more of the plurality of time ranges to minimize the profit reduction amount.

The reset performer 104 is a section that executes the SOC reset charging, which brings the storage battery, e.g., the battery 22, to an over-charged state.

The reset performer 104 outputs a drive signal to the power converter 12 so that the SOC reset charging is executed at the execution timing calculated by the timing calculator 103.

Operation of the charge-discharge controller 10 is described with reference to FIG. 3.

In Step S101, the consideration notifier 102 determines whether of an SOC reset consideration timing has arrived, for considering/determining whether to execute the SOC reset charging.

Figure 4:
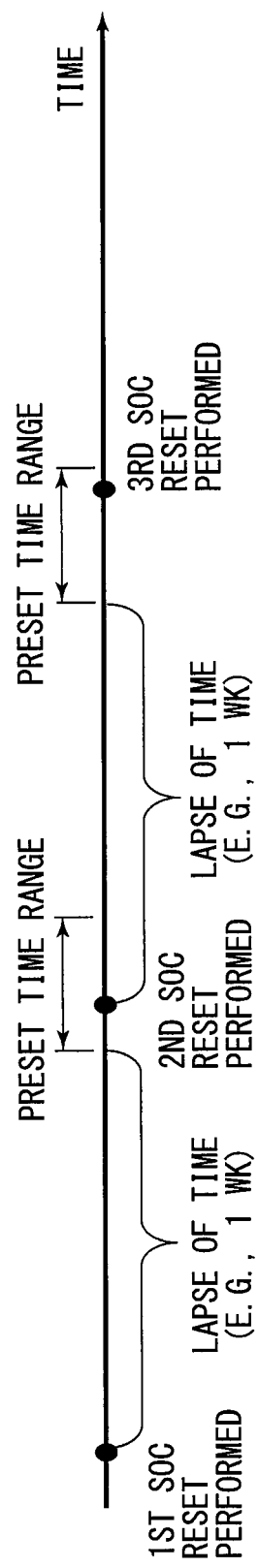
FIG. 4 is an illustration of a processing timing of the charge-discharge controller concerning the embodiment of the present disclosure.

After a first SOC reset charging is performed as shown in FIG. 4 (i.e., 1ST SOC RESET in FIG. 4), a consideration timing arrives at a predetermined interval of one week (i.e., LAPSE OF 1 WK), for considering the execution of the SOC reset charging.

The consideration notifier 102 outputs information, or a trigger, to the timing calculator 103, when determining that the execution timing of the SOC reset charging has arrived.

The consideration notifier 102 repeats determination of Step S101, after determining that the execution timing of the SOC reset charging has not yet arrived.

In Step S102, the timing calculator 103 performs the timing calculation processing, which calculates the execution timing of the SOC reset charging by the reset performer 104.

As shown in FIG. 4, the timing calculator 103 calculates a best timing for executing the second SOC reset charging, within a preset time range.

Figure 5A:
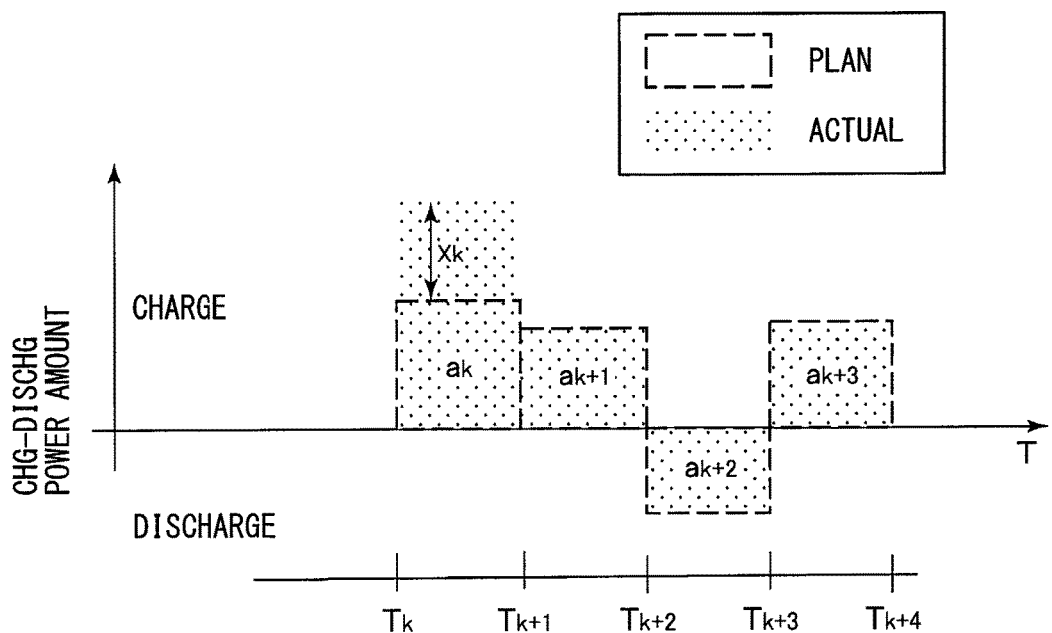
FIG. 5A is a time chart of the SOC reset charging process of the charge-discharge controller concerning the embodiment of the present disclosure.

An example of the SOC reset charging is described with reference to FIGS. 5A and 5B. That is, the timing calculator 103 determines an execution timing of the SOC reset charging Xk as a period (i.e., to be set in a time range) from time Tk to time Tk+1 according to, or partially against, a charge plan ak, ak+1, ak+3 and a discharge plan ak+2 shown with a dashed line in FIG. 5A.

Figure 5B:
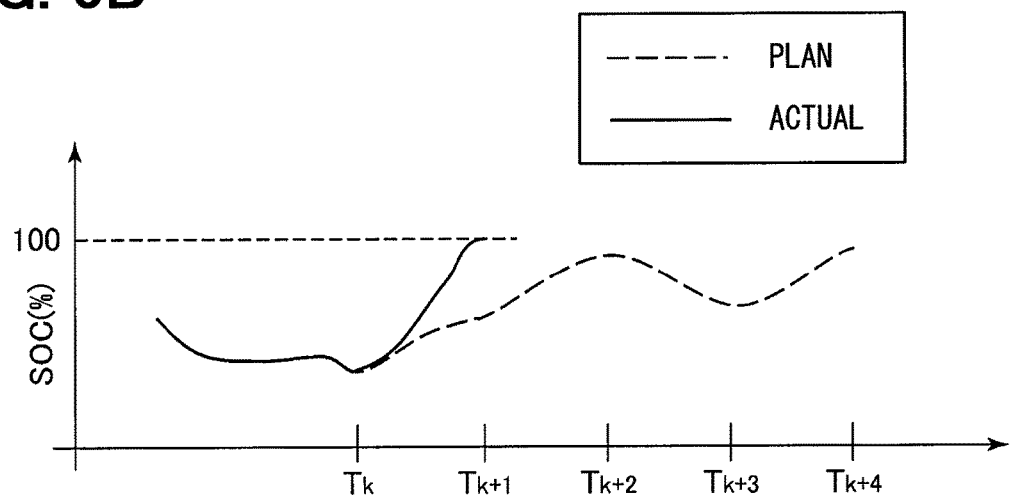
FIG. 5B is another time chart of the SOC reset charging process of the charge-discharge controller concerning the embodiment of the present disclosure.

As shown in FIG. 5B, upon execution of the SOC reset charging Xk, the SOC of the storage battery is brought to 100%.

Figure 6A:
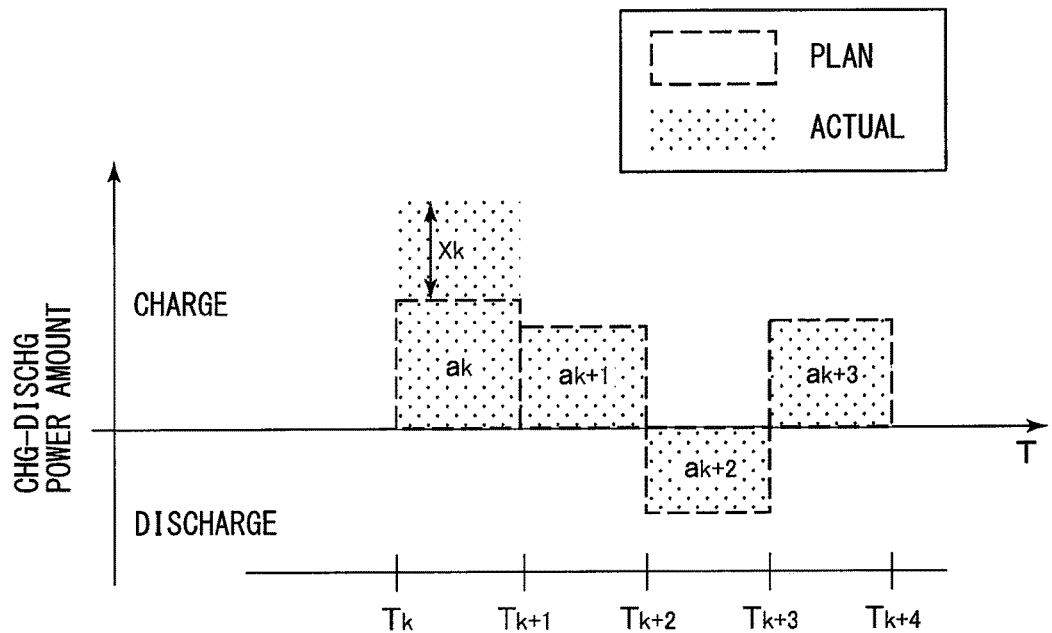
FIG. 6A is a time chart of the SOC reset charging process of the charge-discharge controller concerning the embodiment of the present disclosure.
Figure 6B:
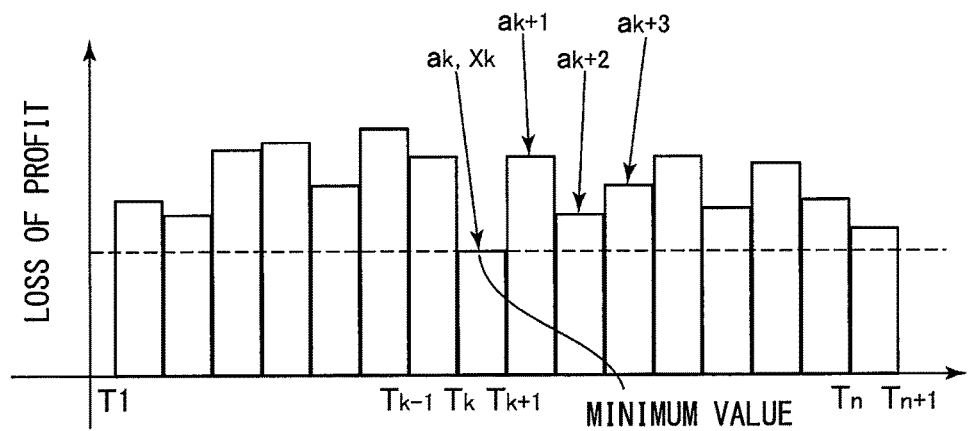
FIG. 6B is another time chart of the SOC reset charging process of the charge-discharge controller concerning the embodiment of the present disclosure.

The timing calculator 103 determines the execution timing of the SOC reset charging Xk to be set in a time range that minimizes the profit reduction amount, as shown in FIGS. 6A and 6B.

Profit information (i.e., LOSS OF PROFIT, or a profit reduction amount in the claims) shown in FIG. 6B is stored in the profit information storage 105.

Figure 3:
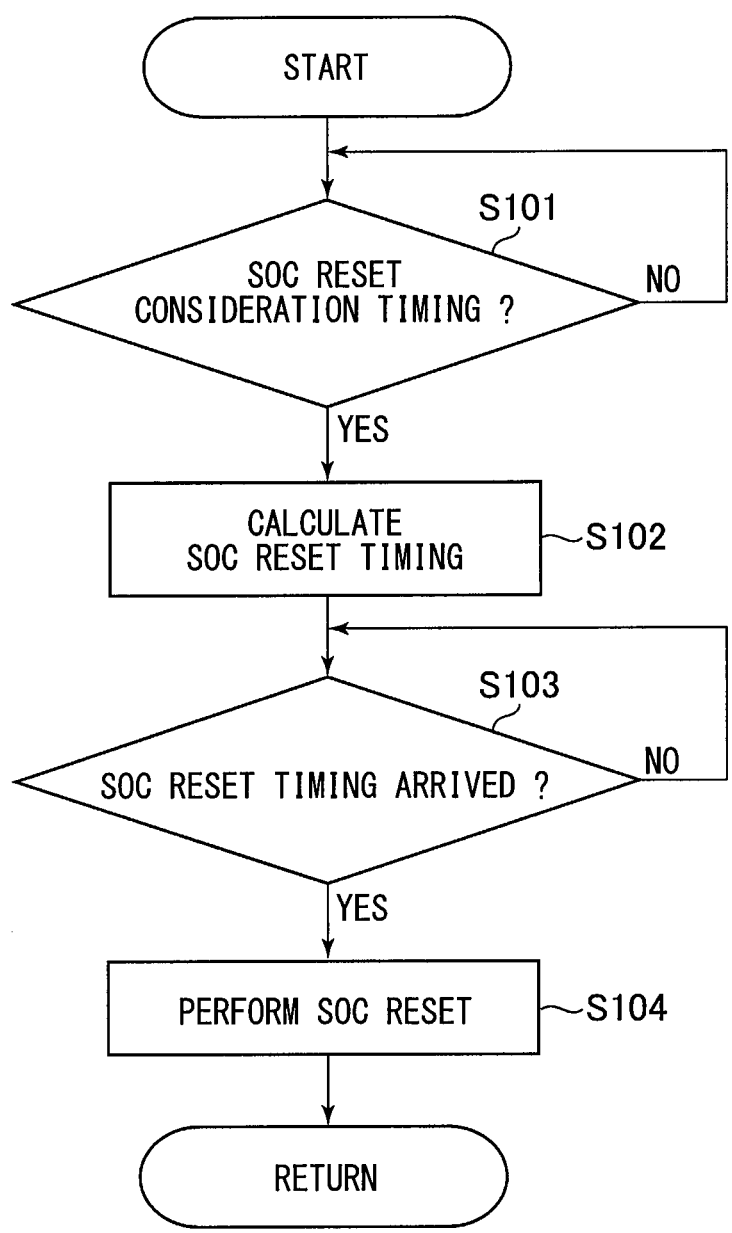
FIG. 3 is a flowchart of a SOC reset charging process of the charge-discharge controller concerning the embodiment of the present disclosure.

The description of the SOC reset charging returns to FIG. 3.

In Step S103 subsequent to S102, the reset performer 104 determines whether the execution timing of the SOC reset charging has arrived.

If it is determined that the execution timing of the SOC reset charging has not yet arrived, processing of Step S103 is repeated, and if it is determined that the execution timing of the SOC reset charging has arrived, the process proceeds to Step S104.

In Step S104, the reset performer 104 outputs a drive signal for executing the SOC reset charging to the power converter 12, and the power converter 12 performs the SOC reset charging.

When a control object, i.e., a battery to be charged, is the in-vehicle battery 22 as shown in FIG. 1, the battery 22 is not chargeable during a period of use of the vehicle 20, i.e., when the battery 22 is not connected to the converter 12.

Figure 7A:
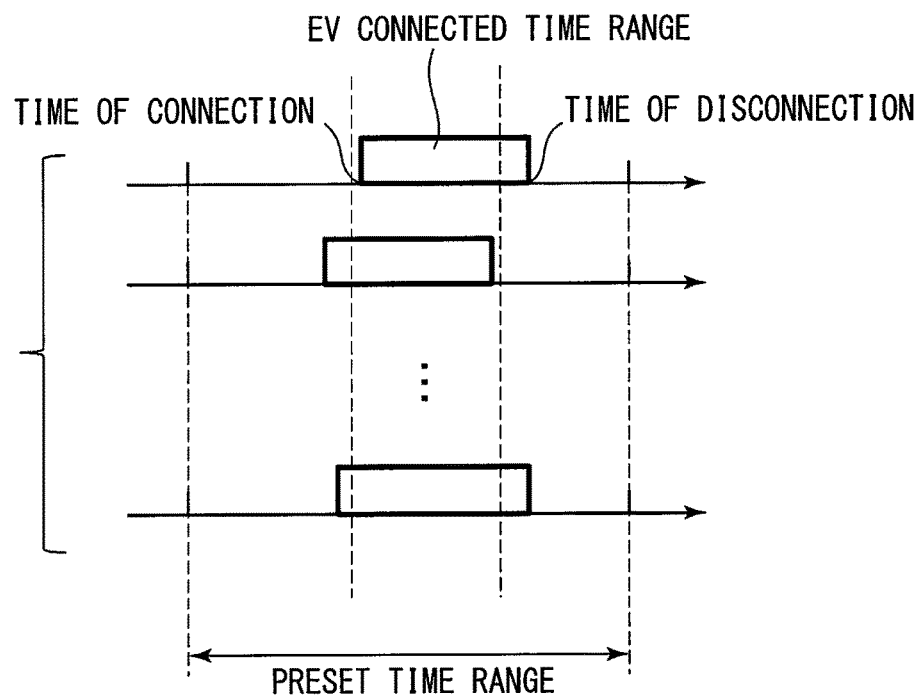
FIG. 7A is a time chart of a forecast process of a charging time range for charging an in-vehicle battery of an electric vehicle.

Therefore, the charge-discharge controller 10 obtains actual use history information regarding EV connected time range(s), i.e., regarding when the in-vehicle battery 22 is connected to the power converter 12, as shown in FIG. 7A.

Figure 7B:
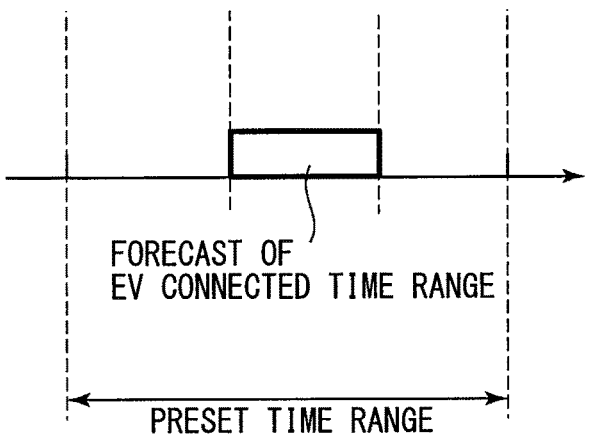
FIG. 7B is another time chart of a forecast process of a charging time range for charging an in-vehicle battery of an electric vehicle.

Based on the actual use history information, the charge-discharge controller 10 calculates a forecast of the EV connected time range, as shown in FIG. 7B.

Then, the timing calculator 103 sets the execution timing for performing the SOC reset charging in a time range with an economical merit which is, as described above, a narrowed-down forecast time range narrowed from a preset time range.

Figure 8:
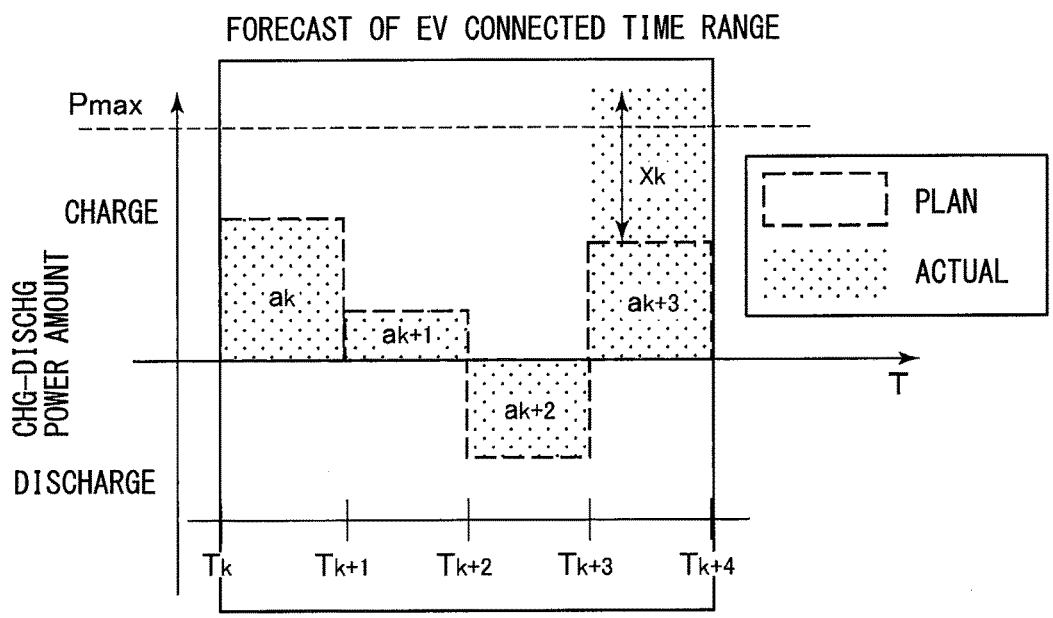
FIG. 8 is an illustration of processing in case of having an over-max time range where a maximum chargeable amount is exceeded.

As shown in FIG. 8, when a maximum chargeable amount Pmax, which is a maximum amount of electric power that can be charged to a battery is being set, the timing calculator 103 adjusts the execution timing of the SOC reset charging so that the maximum chargeable amount Pmax will not be exceeded.

For example, if the SOC reset charging Xk is performed between time Tk+3 and time Tk+4, the maximum chargeable amount Pmax will be exceeded. Thus, such time range, i.e., an over-max time range, is excluded from candidate time ranges for performing the SOC reset charging.

Figure 9:
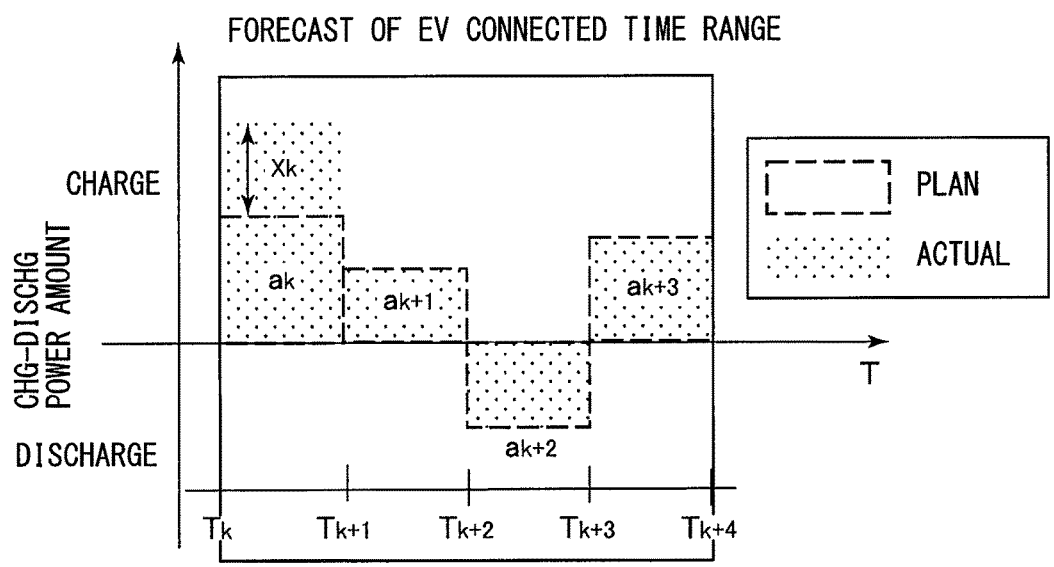
FIG. 9 is a time chart of the SOC reset charging process performed in a single time zone.

As shown in FIG. 9, when performing the SOC reset charging Xk in a single time range, the execution timing of the SOC reset charging is set in a time range which has an economical merit as described above.

However, setting the SOC reset charging only in one time range may lead to an excessive charging situation exceeding the maximum chargeable amount, as described with reference to FIG. 8.

Figure 10:
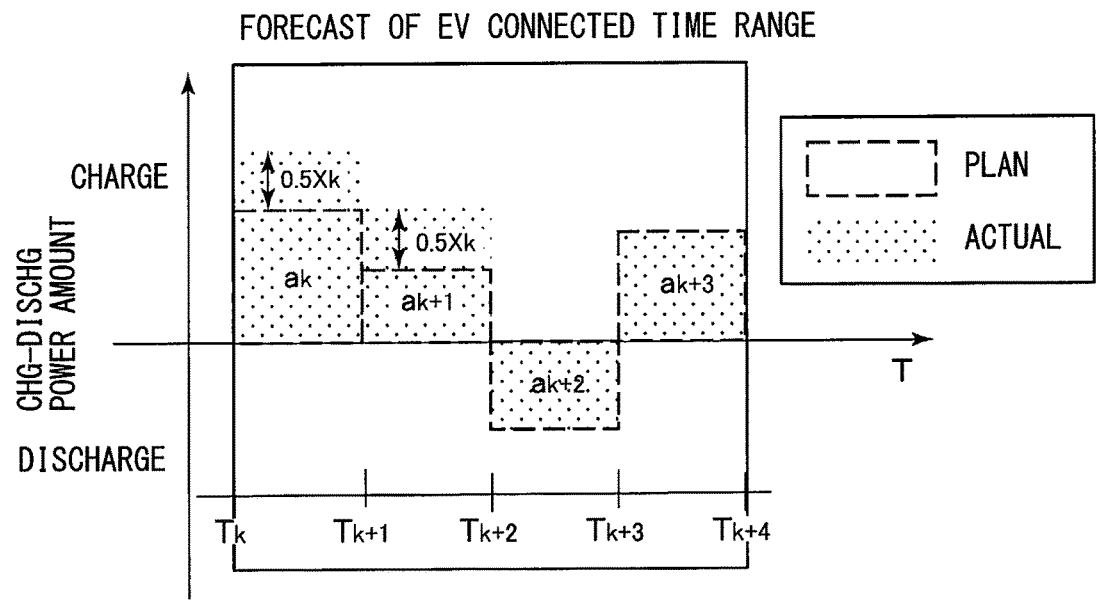
FIG. 10 is a time chart of the SOC reset charging process performed in multiple time zones.

Thus, as shown in FIG. 10, it may be more feasible/preferable to execute the SOC reset charging in a distributed manner in two or more time ranges.

In an example of FIG. 10, the SOC reset charging is evenly distributed among two time ranges, i.e., among a time range from time Tk to time Tk+1 and a time range from time Tk+1 to time Tk+2.

Figure 11:
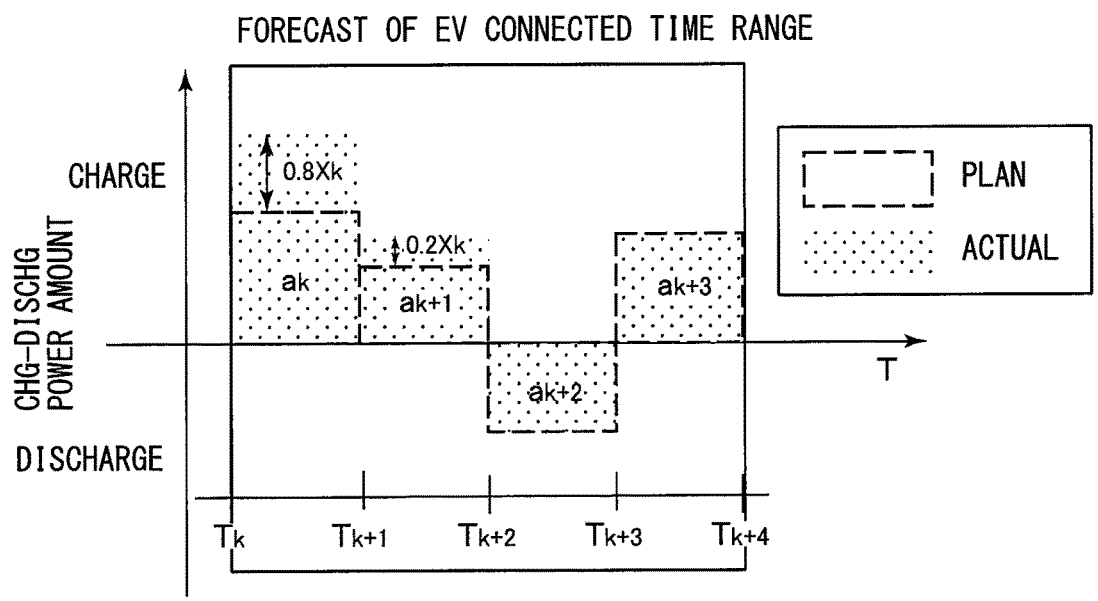
FIG. 11 is a time chart of the SOC reset charging process performed in multiple time zones.

Further, as shown in FIG. 11, it may also be feasible/preferable to distribute 80% of the SOC reset charging to one time range from time Tk to time Tk+1, and to distribute 20% of the SOC reset charging to another time range from time Tk+1 to time Tk+2.

A distribution ratio for distributing the SOC reset charging among a plurality of time ranges may be suitably changed to increase/maximize an economical merit or to minimize the profit reduction amount, e.g., by increasing the distribution ratio of a Tk to Tk+1 time range.

As described above, when the SOC reset charging is performed in a certain time range, it is preferred to perform the SOC reset charging in consideration of how much a profit reduction amount by the SOC reset charging would be.

Further, in case that a planned charge and/or a planned discharge is affected by the execution of the SOC reset charging, i.e., when a loss of profit by divergence from the plan, it is preferred to also take such loss of profit into consideration.

Figure 12A:
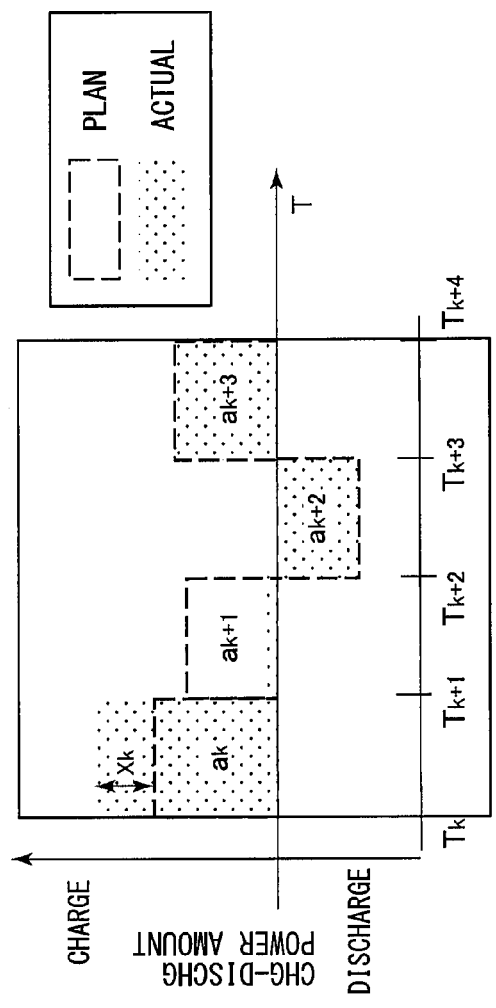
FIG. 12A is a time chart of the SOC reset charging process performed in consideration of a profit reduction amount.

As shown in an example of FIG. 12A, there may be a situation that a charge plan ak and the SOC reset charging Xk are both performed in a time range from time Tk to time Tk+1.

Then, in the next time range from Tk+1 to Tk+2, the charge plan ak+1 may not fully performed as planned, due to a less-than-expected electric power use amount in addition to the SOC reset charging Xk.

Figure 12B:
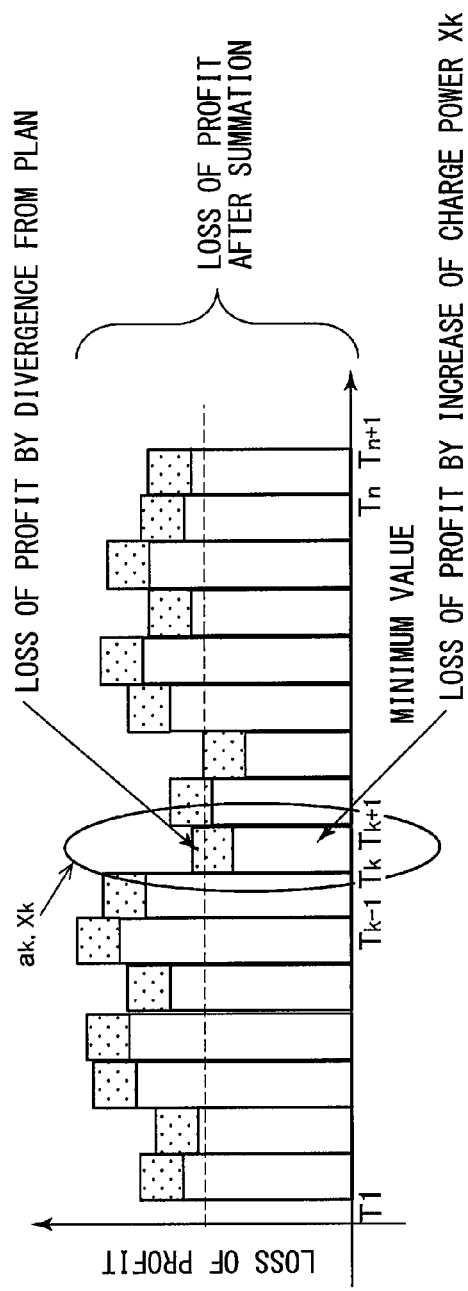
FIG. 12B is another time chart of the SOC reset charging process performed in consideration of a profit reduction amount.

In such case, the loss of profit by a divergence from the plan is expected/forecasted, such a loss of profit may be taken into consideration for the determination of the SOC reset charging, as shown in FIG. 12B.

The charge-discharge controller 10 concerning the present embodiment includes the reset performer 104 that executes the SOC reset charging for bringing the storage battery to an over-charged state and the timing calculator 103 that performs the timing calculation processing, which calculates the execution timing of the SOC reset charging by the reset performer 104.

The timing calculator 103 calculates the profit reduction amount, or a loss of profit, at the time of performing the SOC reset charging for each of the plurality of time ranges, by executing the timing calculation processing, and sets the execution timing for performing the SOC reset charging in one or more time ranges, to minimize the profit reduction amount.

According to the present embodiment, since the execution timing for performing the SOC reset charging is set in one or more time ranges to minimize the profit reduction amount, the determination of the SOC reset charging is made in consideration of both of (i) the SOC of the storage battery and (ii) the profit reduction amount due to the execution of the SOC reset charging.

As described in the present embodiment, with reference to FIGS. 12A and 12B, the timing calculator 103 is capable of setting the SOC reset charging execution timing for performing the SOC reset charging in one time range in consideration of the profit reduction amount in other time range, when the profit reduction amount in the other time range is expected to be incurred by an execution of the SOC reset charging during the one time range.

That is, by taking into consideration the profit reduction amount in the other time range(s), the SOC reset charging is performable in a more economical manner, i.e., in consideration of an economic effect of the SOC reset charging.

Further, as described in the present embodiment with reference to FIG. 8, the timing calculator 103 calculates the required charge amount that is required for bringing the storage battery to an over-charged state for each of the plurality of time ranges, and then is enabled to exclude, from candidate time ranges, an over-max time range in which the required charge amount of the over-charged state calculated in the above exceeds the maximum chargeable amount of the relevant time range.

In such manner, i.e., by excluding the over-max time range from the candidate time ranges, the SOC reset charging is assignable/distributable to an appropriate time range or time ranges, in a feasible manner, which does not set the execution timing of the SOC reset charging in a non-chargeable time range.

Further, as described in the present embodiment with reference to FIGS. 10 and 11, the timing calculator 103 executes the timing calculation process to distribute the required charge amount for bringing the storage battery to the over-charged state among two or more time ranges when executing the SOC reset charging in the two or more time ranges.

Therefore, by such distribution of the required charge amount among two or more time ranges, a possibility of exceeding the maximum chargeable amount is reduced.

Further, as described in the present embodiment with reference to FIG. 11, the timing calculator 103 executes the timing calculation process for a distribution of the required charge amount among the two or more time ranges so that a time range with a greater profit reduction amount has a smaller share of distribution of the required charge amount when executing the SOC reset charging in the two or more time ranges.

Thus, by distributing the required charge amount to the two or more time ranges, the SOC reset charging is performable by minimizing the profit reduction amount, while reducing the possibility of exceeding the maximum chargeable amount.

According to the present embodiment, as described with reference to FIGS. 3 and 4, the timing calculator 103 executes the timing calculation processing at constant intervals.

For example, by executing the timing calculation processing at an interval of one week, the accuracy of an SOC estimation can be periodically raised.

Further, according to the present embodiment, the timing calculator 103 executes the timing calculation processing at a timing when an accumulated power amount of charge and discharge to/from the storage battery exceeds a threshold value, i.e., by accumulating the charge-discharge power amount and by examining the accumulated amount of charge-discharge with reference to the threshold value.

The execution of the timing calculation process at the above-described timing of exceeding the threshold charge-discharge power amount is beneficial for improving the SOC estimation accuracy, because repeated charges and discharges typically increase the error in the SOC estimation.

In the present embodiment, as described with reference to FIG. 1, the storage battery is the in-vehicle battery 22 disposed in a vehicle.

Further, as described in the present embodiment with reference to FIGS. 7A and 73, the timing calculator 103 estimates "a charger-discharger connected time range" during which the vehicle 20 is connected to the charger-discharger, i.e., to the power converter 12, and executes the timing calculation processing so that the SOC reset charging is executed in the charger-discharger connected time range.

By estimating a time range when the vehicle 20 and the in-vehicle battery 22 are connected to the power converter 12, the execution timing of the SOC reset charging is set in a time range during which the SOC reset charging is expected to be more readily/securely performable.

According to the present embodiment, as described with reference to FIG. 7, the timing calculator 103 collects, or obtains, the information about the time range when the vehicle 20 and the in-vehicle battery 22 are connected to the power converter 12, i.e., to a charger-discharger device, and executes the timing calculation processing.

As described in the present embodiment with reference to FIG. 7A and FIG. 7B, the reset performer 104 executes the SOC reset charging after a re-connection of the vehicle 20 and the power converter 12 when the SOC reset charging is incomplete due to a disconnection between the vehicle 20 and the power converter 12 in a midst of a time range during which the SOC reset charging is being executed.

By resuming/continuing the SOC reset charging after re-connection, the SOC reset charging is securely performable, i.e., is securely brought to completion.

Although the storage battery is described as the in-vehicle battery 22 in the above-mentioned example, the storage battery may be two or more, i.e., plural, fixedly-disposed batteries.

In such case, the timing calculator 103 can shift the execution timing of the SOC reset charging for one of the plural batteries from the execution timing of the SOC reset charging for the other batteries. That is, the timing calculator 103 sets the execution timing of the SOC reset charging for each of the plural batteries so that the SOC reset charging is executed for one battery at one time, i.e., in one time range.

An example of performing charge and discharge to a storage battery and a storage battery 2 is described with reference to FIGS. 13A and 13B.

Figure 13A:
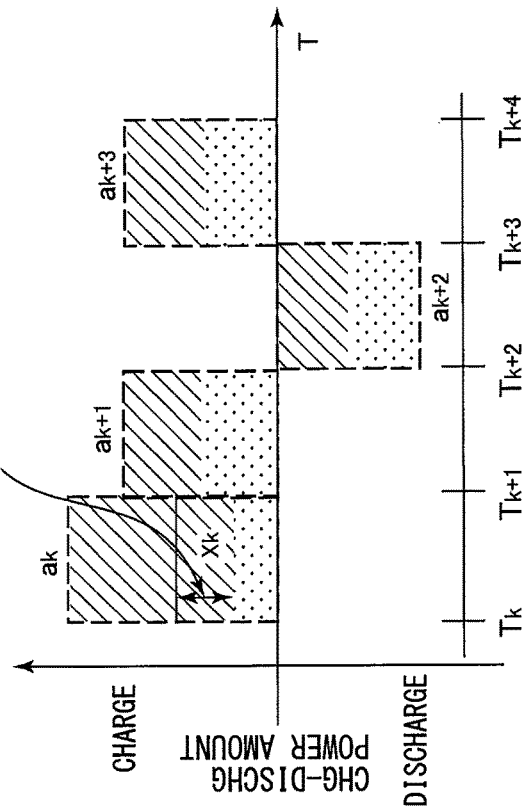
FIG. 13A is a time chart of the SOC reset charging process performed for multiple batteries.
Figure 13B:
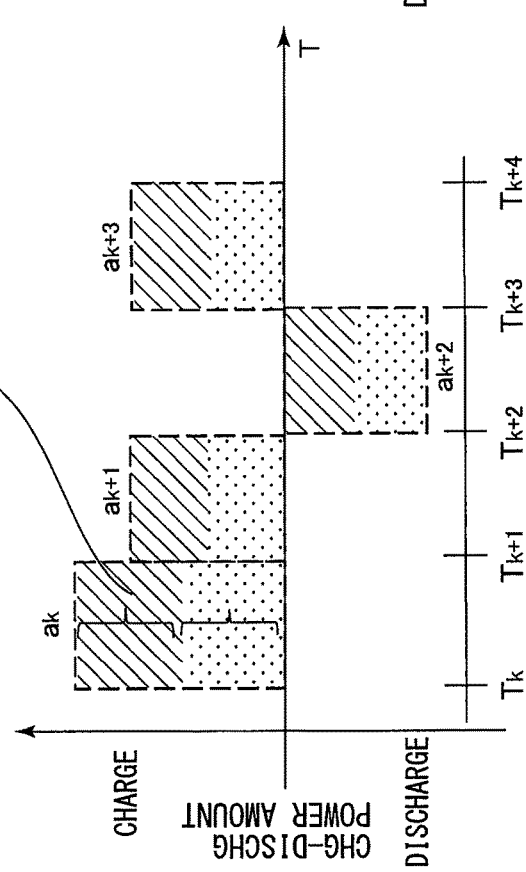
FIG. 13B is another time chart of the SOC reset charging process performed for multiple batteries.

FIG. 13A shows a normal charge-discharge state, and FIG. 13B shows the SOC reset charging.

In FIG. 13A, an amount of charge/discharges is distributed among the storage battery 1 and the storage battery 2 in an overall plan.

When performing the SOC reset charging Xk for the storage battery 1 in a time range from time Tk to time Tk+1, an amount of charge for the storage battery 2 is reducible so that an amount of the overall charge plan ak needs not be changed.

That is, the timing calculator 103 is capable of adjusting/bringing an amount of charge for the plural fixedly-disposed batteries to an amount of the overall charge plan by adjusting an amount of charge for the other batteries other than the one for which the SOC reset charging is currently being executed.

Although the present disclosure has been described in connection with preferred embodiment thereof with reference to the accompanying drawings, it is to be noted that various changes and modifications as well as combinations thereof will become apparent to those skilled in the art, and such changes, modifications, combinations and summarized schemes are to be understood as Is being within the scope of the present disclosure as defined by appended claims, unless otherwise described or unless technical limitations hinder such changes/modifications.

What is claimed is:

1. A charge-discharge controller controlling a state of charge (SOC) of a storage battery that is chargeable and dischargeable, the charge-discharge controller comprising:
   a resetter executing an SOC reset charging that brings the battery to an over-charged state; and
   a timing calculator executing a timing calculation process that calculates an execution timing of the SOC reset charging by the resetter, wherein
   the timing calculator executes the timing calculation process and calculates a profit reduction amount as a difference between a planned charge-discharge monetary profit and a SOC reset charging monetary profit for each of a plurality of time ranges, among which (i) the planned charge-discharge monetary profit is calculated as a profit from charging and discharging according to a preset charge-discharge plan and (ii) the SOC reset charging monetary profit is calculated as a profit from executing the SOC reset charging, and the timing calculator sets the execution timing of the SOC reset charging in one or more time ranges to minimize the profit reduction amount.

2. The charge-discharge controller of claim 1, wherein the timing calculator sets the execution timing for performing the SOC reset charging in one time range in consideration of the profit reduction amount in other time range when the profit reduction amount in the other time range is expected to be incurred by an execution of the SOC reset charging in the one time range.

3. The charge-discharge controller of claim 1, wherein the timing calculator excludes an over-max time range from candidate time ranges for executing the SOC reset charging based on a calculation of a required charge amount to bring the battery to the over-charged state, based on (i) calculating the required charge amount to bring the battery to the over-charged state for each of the plurality of time ranges and (ii) determining the over-max time range, where the required charge amount exceeds a maximum chargeable amount.

4. The charge-discharge controller of claim 1, wherein the timing calculator executes the timing calculation process to distribute the required charge amount to bring the battery to the over-charged state among two or more time ranges, when executing the SOC reset charging in the two or more time ranges.

5. The charge-discharge controller of claim 4, wherein the timing calculator executes the timing calculation process for a distribution of the required charge amount among the two or more time ranges so that a time range with a greater profit reduction amount has a smaller share of distribution of the required charge amount, when executing the SOC reset charging in the two or more time ranges.

6. The charge-discharge controller of claim 1, wherein the timing calculator executes the timing calculation process at constant intervals.

7. The charge-discharge controller of claim 1, wherein the timing calculator executes the timing calculation process when an accumulated power amount of charge and discharge of the battery exceeds a threshold value.

8. The charge-discharge controller of claim 1, wherein the battery is an in-vehicle battery disposed in a vehicle.

9. The charge-discharge controller of claim 8, wherein the timing calculator estimates a charger-discharger connected time range during which the vehicle is connected to the charger-discharger, and executes the timing calculation process so that the SOC reset charging is executed in the charger-discharger connected time range.

10. The charge-discharge controller of claim 9, wherein the timing calculator collects information about the charger-discharger connected time range, when the vehicle is connected to the charger-discharger for executing the timing calculation process.

11. The charge-discharge controller of claim 9, wherein the resetter executes the SOC reset charging after a re-connection of the vehicle and the charger-discharger, when the SOC reset charging is incomplete due to a disconnection between the vehicle and the charger-discharger, during a time range during which the SOC reset charging is being executed.

12. The charge-discharge controller of claim 1, wherein the battery is provided as plural pieces of a device.

13. The charge-discharge controller of claim 12, wherein the timing calculator sets the execution timing of the SOC reset charging for each of the plural battery devices, so that the SOC reset charging is executed for one battery device in one time range.

14. The charge-discharge controller of claim 12, wherein the timing calculator adjusts a charge amount of other battery devices other than a SOC-reset-charging battery device for which the SOC reset charging is currently being executed so that a total charge amount of the plural battery devices is brought close to a planned charge amount.

* * * * *